US012389084B2

(12) United States Patent
Tomimori et al.

(10) Patent No.: US 12,389,084 B2
(45) Date of Patent: Aug. 12, 2025

(54) CONTENT DISTRIBUTION SERVER (71) Applicant: TOMODY, Inc., Tokyo (JP)

(72) Inventors: Takeshi Tomimori, Tokyo (JP);
Takatoshi Katsura, Tokyo (JP);
Kousuke Kurauchi, Saitama (JP)

(73) Assignee: TOMODY, Inc., Tokyo (JP)

( * ) Notice: Subject to any disclaimer, the term of this patent is extended or adjusted under 35 U.S.C. 154(b) by 0 days.

(21) Appl. No.: 18/690,727

(22) PCT Filed: Sep. 17, 2021

(86) PCT No.: PCT/JP2021/034436
§ 371 (c)(1),
(2) Date: Mar. 9, 2024

(87) PCT Pub. No.: WO2023/042403
PCT Pub. Date: Mar. 23, 2023

(65) Prior Publication Data
US 2024/0373105 A1 Nov. 7, 2024

(51) Int. Cl.
*H04N 21/80* (2011.01)
*G06F 3/01* (2006.01)
(Continued)

(52) U.S. Cl.
CPC ............. *H04N 21/80* (2013.01); *G06F 3/017* (2013.01); *G11B 27/031* (2013.01); *H04L 12/18* (2013.01);
(Continued)

(58) Field of Classification Search
CPC .... H04N 21/23406; H04N 21/80; H04N 7/15; G06F 3/017; G11B 27/031; H04L 29/06414; H04L 12/18; H04L 65/403
See application file for complete search history.

(56) References Cited

U.S. PATENT DOCUMENTS 8,789,094 B1* 7/2014 Singh ................. H04N 21/4788
725/62
10,382,722 B1* 8/2019 Peters .................... H04N 7/152
(Continued)

FOREIGN PATENT DOCUMENTS

| JP | 2005-051703 A | 2/2005 |
| JP | 2009-267999 A | 11/2009 |
| JP | 2016-039612 A | 3/2016 |

OTHER PUBLICATIONS

International Search Report for International Patent Application No. PCT/JP2021/034436, Dec. 14, 2021.
(Continued)

*Primary Examiner* — Nicholas T Corbo
(74) *Attorney, Agent, or Firm* — Potomac Law Group, PLLC (57) ABSTRACT

A content distribution server that can provide a content editing function for streaming distribution at a low cost without any physical constraints is provided. Streamer videos from a plurality of streamer terminals are received via a network and stored temporarily in a buffer unit. The plurality of streamer videos in the buffer unit are synthesized to generate an edit screen, which is transmitted to the editor terminal connected via the network. An editor performs an edit operation such as switching selection of the streamer videos, an instruction on screen configuration, and caption input on the edit screen, and transmits the edit operation as edit information from the editing terminal to the content distribution server. The content distribution server generates streaming content from the streamer videos in the buffer unit based on the edit information and distributes the streaming content to a viewer terminal.

3 Claims, 7 Drawing Sheets

(51) Int. Cl.
  *G11B 27/031* (2006.01)
  *H04L 12/18* (2006.01)
  *H04L 65/403* (2022.01)
  *H04N 7/15* (2006.01)
  *H04N 21/234* (2011.01)

(52) U.S. Cl.
  CPC ............ *H04L 65/403* (2013.01); *H04N 7/15* (2013.01); *H04N 21/23406* (2013.01)

(56) References Cited

U.S. PATENT DOCUMENTS

| | | | |
|---|---|---|---|
| 11,567,785 B2* | 1/2023 | Faulkner | G06F 8/38 |
| 2010/0085415 A1* | 4/2010 | Rahman | G01S 3/80 |
| | | | 348/E7.083 |
| 2015/0092009 A1* | 4/2015 | DeLuca | H04N 7/15 |
| | | | 348/14.08 |
| 2015/0286858 A1* | 10/2015 | Shaburov | G06V 40/167 |
| | | | 382/103 |
| 2016/0165184 A1* | 6/2016 | Aaron | H04L 12/1822 |
| | | | 348/14.08 |

OTHER PUBLICATIONS

Office Action drafted Mar. 10, 2022, in Japanese Patent Application No. 2022-503425.
English translation of International Preliminary Report on Patentability for International Patent Application No. PCT/JP2021/034436, Mar. 5, 2024.

* cited by examiner

CONTENT DISTRIBUTION SERVER

TECHNICAL FIELD

The present invention relates to a video distribution server that relays video images from a plurality of cameras and distributes live streaming broadcasts to a plurality of viewer terminals.

BACKGROUND ART

In recent years, environmental enhancements in networks, such as mobile networks, and widespread use of image capturing devices have made it possible for anyone to stream video images regardless of the type of terminal used or location. Especially development of online videoconferencing systems has enabled online talking distribution and online lessons using an online videoconferencing system that relays videos captured at a plurality of terminals networked remotely with each other and performs streaming distribution.

Also, in creation of related art video content such as for TV broadcasting, switching operations are conducted for a plurality of camera image inputs, and editing equipment called a switcher is used to output videos for broadcasting.

PTL 1 discloses a live streaming broadcasting device that edits a plurality of incoming camera video data while inputting videos from a plurality of cameras to perform streaming distribution. A switcher function is provided as one of editing functions of this live streaming broadcasting device.

CITATION LIST

Patent Document

PTL 1: Japanese Patent Application Laid-Open No. 2005-51703

SUMMARY OF THE INVENTION

Problems to be Solved by the Invention

The present inventors have recognized a new problem that related art videoconferencing systems cannot sufficiently provide a video editing function, especially a switcher function, for live streaming distribution of online talk distribution, online lessons, etc., where a plurality of video image streamers separated on a network participate.

When a videoconferencing system is employed as a method of streaming distribution using videos captured by a plurality of terminals, screen switching, layout of captured videos on a screen, etc., are selected automatically by the videoconferencing system from screen switching based on speaker detection and pre-fixed screen configuration. Therefore, there is a problem that it is difficult for streamers to reflect their intentions in the program configuration, such as in arbitrary screen switching or screen configuration changes.

To solve this problem, the following issues were found to exist when combining the related art switchers such as those for TV broadcasting. The related art switchers such as those for TV broadcasting are provided as hardware devices, so that videos from a plurality of cameras need to be integrated and connected to the switcher. Also in PTL 1, it is configured that outputs from a plurality of cameras are input in a switcher as video inputs. Since neither of these configurations supports direct input of a video transmitted over a network, when switching is to be realized with the above-described streamers remotely connected to one another over a network, each streamer should have a terminal for relaying communication with a terminal of each streamer on the network, and videos should be input via those relay terminals. Therefore, the equipment configuration becomes large and there is a problem that it is difficult for ordinary users to install the equipment in terms of installation labor and cost. In addition, because the size of the equipment configuration makes it difficult to physically move the editing equipment including a switcher, when an editor in charge of switching and at least one of streamers want to stream from the same location, the large editing equipment should be transported to the location where that streamer intends to make the distribution, or the streamer should travel to the editor's location where the switching equipment is located, which would impose physical constraints.

An object of the present invention is to provide a video distribution server that provides a means for editing videos by the server, and can provide a content editing function for streaming distribution from a plurality of streamer videos connected via a network at a low cost without physical constraints.

While means for solving these problems will be described below, other problems and novel features will become clear from the description of the specification and the accompanying drawings.

Means for Solving Problems

According to one embodiment of the present invention, a means for solving the problems is as follows.

A content distribution server that receives streamer videos from a plurality of streamer terminals connected via a network, generates streaming content, and distributes the streaming content to a viewer terminal, the content distribution server including each of the following configurations: a streamer video receiving unit that receives the plurality of streamer videos; a buffer unit that temporarily stores the plurality of streamer videos; an edit screen generation unit that synthesizes the plurality of streamer videos in the buffer unit and generates an edit screen for accepting an edit operation of the streaming content from an editor terminal connected via the network; an edit information transmitting/receiving unit that transmits the edit screen to the editor terminal and receives, as edit information, the edit operation entered from the editor terminal via the edit screen; a streaming content generation unit that generates the streaming content from the plurality of streamer videos held in the buffer unit on the basis of the edit information; and a streaming content distribution unit that distributes the streaming content to the viewer terminal via the network.

Effect of the Invention

The effect to be produced by the above-described embodiment will be briefly described below.

The content distribution server of the present embodiment can provide a means for editing streaming content as software from the server when distributing the streaming content from a plurality of streamer terminals connected via a network. This eliminates the problems of location constraints for streamers and editors, complicated setup due to the size of equipment, and cost that have occurred since the function of editing streaming content such as a switcher is provided as hardware equipment, and allows anyone to easily stream high quality streaming content at low cost and without physical constraints.

DETAILED DESCRIPTION OF THE INVENTION

1.2. Outline of Embodiment

First, an exemplary embodiment disclosed in the present application will be outlined. Reference numerals in the drawings referred to in parentheses in the outline of the exemplary embodiment are merely illustrative of what are included in the concepts of components to which they are attached.

[1] Content Distribution Server Equipped with Video Switching Means

Figure 1:
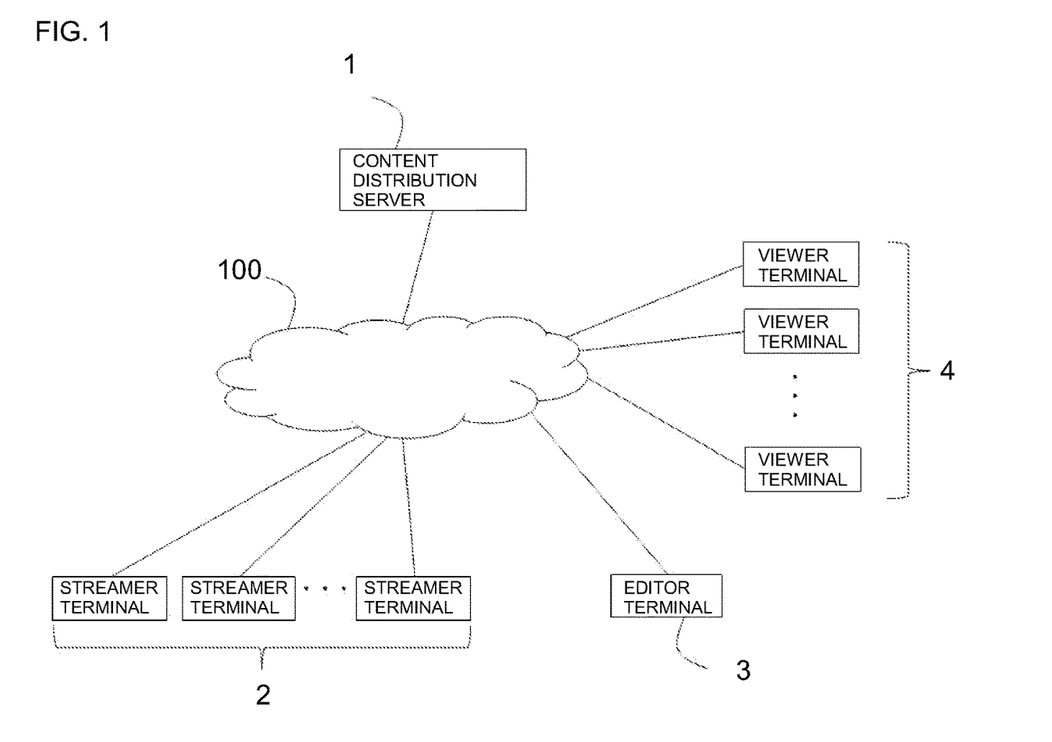
FIG. 1 is a schematic diagram showing an example of an equipment configuration of a content distribution server and a streaming content distribution method using a content distribution server according to a first embodiment.
Figure 2:
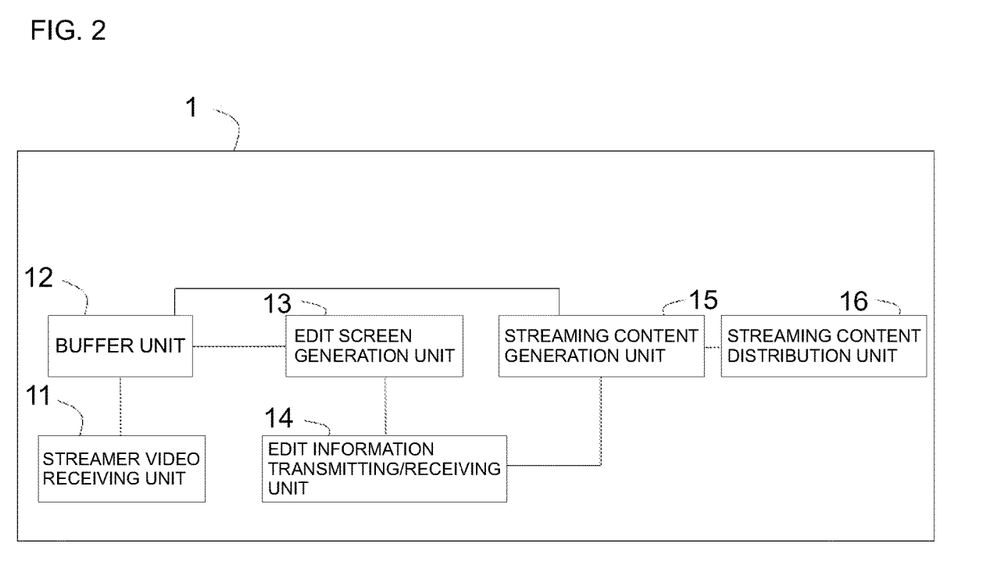
FIG. 2 is a block diagram showing an example of a functional configuration of the content distribution server according to the first embodiment.

An exemplary embodiment of the present invention is a content distribution server (1) that receives streamer videos from a plurality of streamer terminals (2) connected via a network (100), generates streaming content, and distributes the streaming content to viewer terminals (4), the content distribution server (1) including each of the following configurations (see FIG. 1 and FIG. 2):

- a streamer video receiving unit (11) that receives the plurality of streamer videos;
- a buffer unit (12) that temporarily stores the plurality of streamer videos;
- an edit screen generation unit (13) that synthesizes the plurality of streamer videos in the buffer unit and generates an edit screen for accepting an edit operation of the streaming content from an editor terminal (3) connected via the network;
- an edit information transmitting/receiving unit (14) that transmits the edit screen to the editor terminal and receives, as edit information, the edit operation entered from the editor terminal via the edit screen;
- a streaming content generation unit (15) that generates the streaming content from the plurality of streamer videos held in the buffer unit on the basis of the edit information; and
- a streaming content distribution unit (16) that distributes the streaming content to the viewer terminal via the network.

Here, the streamer terminal (2) refers to a terminal device equipped with an image capturing device. This particularly means that the streamer terminal (2) includes devices in which an image capturing device is integrated with a terminal device, such as a smartphone, a cell phone and a laptop computer, as well as a digital camera with a network communication function and a PC terminal to which a digital camera is connected. The network (100) is to connect a streamer terminal, a content distribution server, an editor terminal, and a viewer terminal for mutual communication. Examples thereof may include the Internet or a mobile network, and the communication may be wired or wireless.

With this configuration, the content editing function in conducting streaming distribution from a plurality of streamer videos connected via a network can be provided as software, enabling a streamer and an editor to edit and stream streaming content without physical constraints on streaming location and at low cost.

[2] Switcher Function

In the content distribution server (1) of [1], the edit information includes a screen configuration in the streaming content and a switching instruction for the plurality of streamer videos to be laid out in the screen configuration.

This allows the content distribution server (1) to provide a switcher function in software that were previously provided by hardware, enabling a streamer and an editor to edit and stream streaming content without physical constraints on streaming location and at low cost.

[3] Playback Function

The content distribution server of [1] or [2] further includes a streamer video storage means (17).

The streamer video storage means stores a part or all of the plurality of streamer videos stored in the buffer unit.

The edit information transmitting/receiving unit further includes a function of receiving, included in the edit information, a playback instruction entered at the editor terminal via the edit screen.

The playback instruction includes specification of a streamer video to play back in the streamer video storage means and indication of a time range of the video to play back to be switched and inserted in the streaming content.

The streaming content generation unit generates, based on the received edit information, the streaming content using the specified range of streamer video in the streamer video storage means specified in the playback instruction.

In this manner, a part of past streamer video can be included in the streaming content. For example, in an online lesson on sports, etc., an editing terminal can be manipulated to instantly review actions of a coach who is a streamer and to include the coach's actions in the streaming content, to thereby enhance the streaming content.

[4] Gesture Function

The content distribution server of any one of [1] to [3] further includes a gesture recognition unit (18).

The gesture recognition unit recognizes that one of the streamers has performed a predetermined gesture in the plurality of streamer videos received from the buffer unit. When the recognized gesture is one requesting a switching operation in the streaming content, the gesture recognition unit transmits edit information to the streaming content generation unit based on the detected gesture.

This allows the streamers to instantly switch screens at their will. While edit operations such as screen switching are performed on the basis of a content program configuration or at the discretion of the editor under normal circumstances, instant switching by an action of a streamer could create streaming content that better reflects the streamer's intentions and gives a sense of realism to a viewer. Also, a streamer can carry out a switch/edit operation of streaming content without manipulating a streamer terminal or an editing terminal himself/herself, so the streamer's operation is not interrupted during content distribution.

2. Details of Embodiments

Details of the embodiments will be described in more detail.

First Embodiment

FIG. 1 is a block diagram showing a configuration example of a content distribution system including a content distribution server according to a first embodiment.

As shown in FIG. 1, content distribution server 1 is connected to a plurality of streamer terminals 2 and editor terminal 3 via network 100 and can distribute streaming content to a plurality of viewer terminals 4.

Streamer terminal 2 is used by a content streamer to capture a video and transmit the captured video to content distribution server 1 via network 100. Streamer terminal 2 is a terminal with an image capturing function and a network communication function, and an example thereof is a smartphone, a cell phone with a camera, a laptop computer, or a digital camera with a communication function. The image capturing function and the network communication function may be provided in separate devices connected to each other, or may be a personal computer or other device to which a digital camera is connected.

Editor terminal 3 displays an edit screen provided by content distribution server 1 and transmits an edit operation entered by an editor via the edit screen to content distribution server 1 as edit information. Editor terminal 3 has a communication function with network 100, a display function to display an edit screen, and an input function to accept an edit operation from the editor. Specifically, a tablet or a smartphone that can be operated by touch is desirable as editor terminal 3. The display function, the communication function, and the input function may be implemented in separate housings, or in terminals such as general-purpose personal computers.

Viewer terminal 4 is a terminal for displaying and viewing streaming content distributed from content distribution server 1. Viewer terminal 4 has a communication function with network 100 and a display function of displaying streaming content. Examples of viewer terminal 4 may include a smartphone, a tablet, a laptop computer and a television set. The display function and the communication function may be implemented in separate housings, or may be general-purpose terminals such as personal computers. While a plurality of viewer terminals is illustrated in FIG. 1, a single viewer terminal may be used.

Network 100 connects content distribution server 1, streamer terminal 2, editor terminal 3, and viewer terminal 4 for mutual communication. While desired example of network 100 may be a mobile network and the Internet, closed communication networks such as Local Area Networks (LAN) may also be used. The form of network 100 is not limited to wired or wireless.

Configuration of Content Distribution Server

FIG. 2 is a block diagram showing an example of a functional configuration of content distribution server 1. Content distribution server 1 is provided with streamer video receiving unit 11, buffer unit 12, edit screen generation unit 13, edit information transmitting/receiving unit 14, streaming content generation unit 15, and streaming content distribution unit 16. More specifically, content distribution server 1 may be a data server equipped with interfaces to connect to a network such as the Internet in streamer video receiving unit 11, edit information transmitting/receiving unit 14, and streaming content distribution unit 16. Desirably, content distribution server 1 is implemented using a cloud server. Here, it is suitable that functions required for streamer video receiving unit 11, edit information transmitting/receiving unit 14, streaming content distribution unit 16, etc., are realized by making a program (software) run on a computer that constitutes a cloud server.

Streamer video receiving unit 11 conducts a process of receiving streamer videos from a plurality of streamer terminals 2 via network 100. Streamer video receiving unit 11 is configured to be capable of receiving streamer videos from a plurality of streamer terminals 2 simultaneously and independently.

Buffer unit 12 temporarily buffers and stores, in predetermined units, the streamer videos received at streamer video receiving unit 11. In particular, buffer unit 12 stores the streamer videos while updating them so that the length of the streamer video to be recorded in buffer unit 12 is from several seconds to several tens of seconds.

Edit screen generation unit 13 generates data for edit screen 5 shown, for example, in FIG. 3 (described later). Data for edit screen 5 consists of edit screen layout information that indicates a configuration of edit screen 5 and image capturer video acquisition control information for acquiring a streamer video specified in the edit screen layout information from buffer unit 12. In edit screen information 5, specifically, the edit screen layout information consists of a programming language of HTML, the control information consists of a programming language of JavaScript, etc. The information is displayed and executed by a browser in editor terminal 3. Alternatively, an application for displaying the edit screen may be installed in editor terminal 3 and information for the edit screen may be generated with a predetermined protocol.

Edit information transmitting/receiving unit 14 transmits edit screen 5 generated by edit screen generation unit 13 to editor terminal 3 via network 100. Edit information transmitting/receiving unit 14 also receives a request according to the image capturer video acquisition control information from editor terminal 3, and based on the request, transmits a plurality of streamer videos to be displayed on edit screen 5 to editor terminal 3 in real time. It is desirable that the plurality of to-be-transmitted streamer videos be reduced to thumbnail size and transmitted in order to reduce communication capacity. Also, the aforementioned edit operations entered by the editor via the edit screen at editor terminal 3 are received from editor terminal 3 as edit information. Specifically, the edit information is on-screen layout information of streamer videos in streaming content, switching information of streamer videos to display, audio control information of a plurality of streamer videos displayed, etc.

Streaming content generation unit 15 creates streaming content based on the edit information received at edit information transmitting/receiving unit 14. The edit information includes on-screen layout information of streamer videos in streaming content, switching information of streamer videos to display, audio control information of a plurality of streamer videos displayed, etc. Streaming content generation unit 15 acquires streamer videos from buffer unit 12, and conducts layout, switching, and adjustment of audio of the videos on the screen based on the acquired edit information to create streaming content.

Streaming content distribution unit 16 receives streaming content from streaming content generation unit 15 and distributes the streaming content to viewer terminals via network 100.

Configuration of Edit Screen

Figure 3:
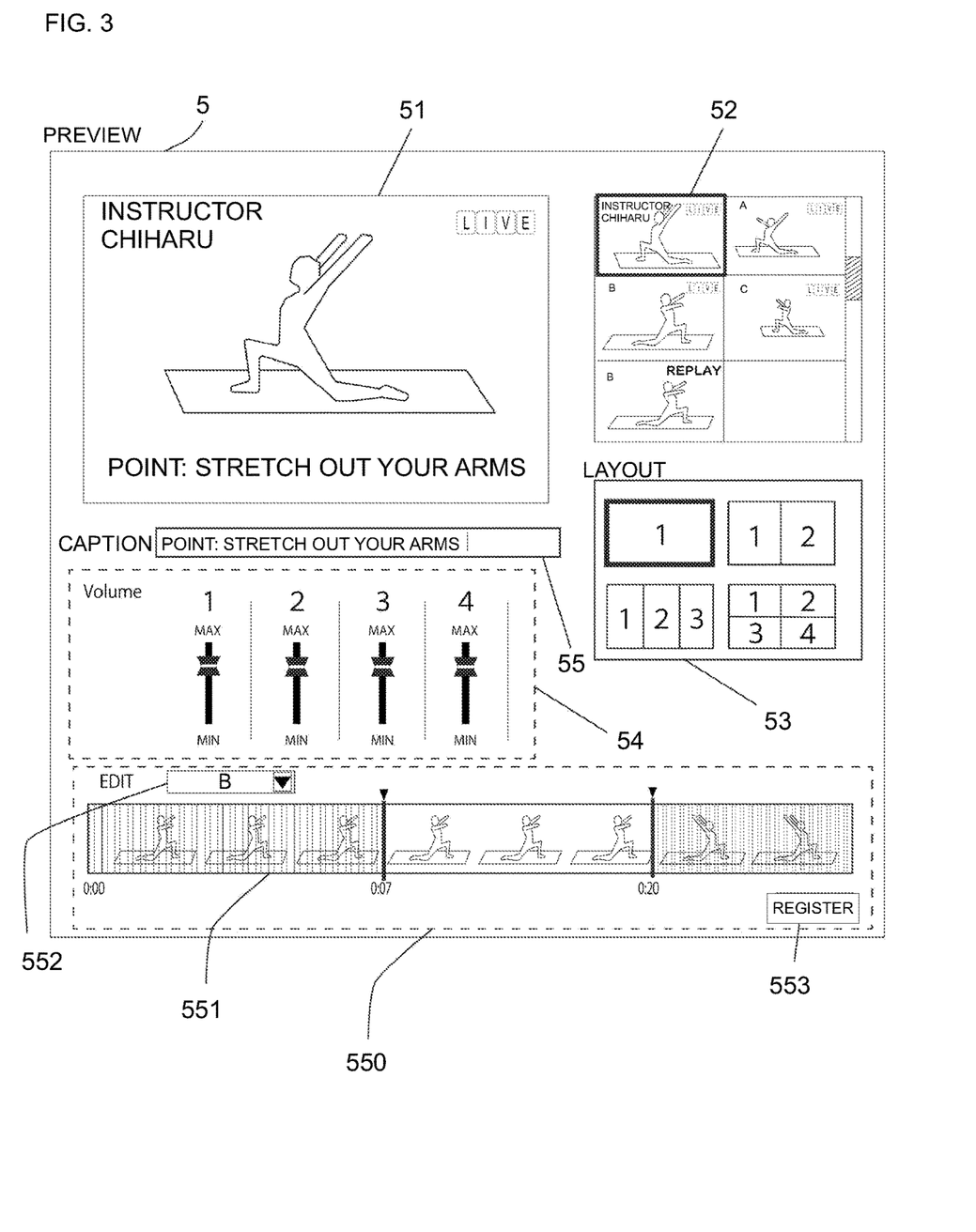
FIG. 3 is a schematic diagram of an example of an edit screen.

FIG. 3 is a schematic diagram showing an example of edit screen 5 displayed at editor terminal 3. As described above, edit screen 5 is generated by edit screen generation unit 13 of content distribution server 1, transmitted from edit information transmitting/receiving unit 14 to editor terminal 3 via network 100, and displayed on the display screen of editor terminal 3.

Editor terminal 3 has a function of receiving a plurality of streamer videos from edit screen generation unit 13 in real time and displaying the received streamer videos as edit screen 5, and lists the received streamer videos in thumbnail display section 52. Thumbnails of streamer videos received in real time are displayed in thumbnail display section 52 and are updated on an as-needed basis. The editor can select any streamer video displayed in thumbnail display section 52 by a touch operation on the display screen or a selection operation with a mouse cursor, and thumbnail display section 52 accepts the input. An outer frame of a selected streamer video is highlighted as shown in FIG. 3 to indicate that it has been selected. The selecting method and the displaying method of the streamer video are illustrative only and are not limited to these configurations.

Layout selection section 53 selects a screen configuration of streaming content and accepts an instruction. In the present embodiment, formats of streamer videos to display at the same time are displayed in layout selection section 53, and setting a layout in which a single image capturer video is displayed in full screen size and a layout in which a screen is divided into two or four parts can be selected using icons. Layouts are not limited to those described above, and other variations such as two vertical parts, eight parts, wipe-in, etc. may be provided for selection. In the example of FIG. 3, a display in which a single streamer video is displayed on a single screen has been selected, and an outer frame of the corresponding icon in layout selection section 53 is highlighted to be visible.

Caption input section 55 accepts input from the editor for the caption to be displayed on the screen. Although not shown in the drawings, an input section for specifying a display location of the caption and an input section for specifying font and color of the caption may be provided additionally.

In preview display section 51, a preview of the streaming content in which the results of the editor's input to thumbnail display section 52, layout selection section 53, and caption input section 55 are reflected is displayed. In a preview display, a video synthesized by appropriately arranging a plurality of streamer videos displayed in thumbnail display section 52 is displayed. The streaming content distributed to viewer terminal 4 is obtained by the processing at the distribution server described below, and the preview is generated and displayed for confirmation of the streaming content at the editor terminal.

Operation of Content Distribution Server

Next, a series of operations of content distribution server 1 from receiving streamer videos captured by streamer terminals 2 to distributing streaming to viewer terminals 4 will be described with reference to specific examples. This specific example is merely illustrative and not limiting the content to be distributed and the operation of content distribution server 1 in the present invention.

In the present embodiment, the streamers shall stream lessons online. One of the streamers is an instructor of the lesson and a plurality of students are taking the lesson online. In other words, the instructor and the students of the online lesson are the streamers, and they are having the online lesson on streamer terminals 2. Streamer terminal 2 is equipped with a camera and a communication function and transmits a captured video to content distribution server 1 as a streamer video. The communication among the streamers through the online lesson is carried out using an existing videoconferencing system, not shown in the drawings, which may be provided by a server different than content distribution server 1, or may be provided by content distribution server 1.

The streamer video from each streamer terminal 2 during the online lesson is a captured video used in a videoconferencing system and is transmitted to content distribution server 1 independently for each streamer terminal.

Streamer video receiving unit 11 receives streamer videos from a plurality of streamer terminals 2. Streamer video receiving unit 11 receives streamer videos while recognizing from which terminal the received streamer video came, and records the received streamer videos in buffer unit 12 along with the recognized information. For the identification of the source of the streamer videos, user information set in streamer terminal 2 and a username used in the videoconferencing system are desirable, but an IP address and a terminal name of the streamer terminal may be used as well.

Edit screen generation unit 13 then generates data for edit screen 5 illustrated in FIG. 3. Data for edit screen 5 consists of edit screen layout information that indicates a configuration of edit screen 5 in advance, and image capturer video acquisition control information for acquiring a streamer video from buffer unit 12 transmitted from editor terminal 3. In data of edit screen 5, specifically, the edit screen layout information consists of a programming language of HTML, the image capturer video control information consists of a programming language of JavaScript, etc. The data is displayed and executed by a browser in editor terminal 3. Alternatively, an application for displaying the edit screen may be installed in editor terminal 3 and information for the edit screen may be generated with a predetermined protocol.

Edit information transmitting/receiving unit 14 transmits the data of edit screen 5 to editor terminal 3, and editor terminal 3 receives the data of edit screen 5 and displays edit screen 5 on a display device. Editor terminal 3 receives the streamer videos in real time from buffer unit 12 via edit information transmitting/receiving unit 14 according to the image capturer video acquisition control information in the data on edit screen 5. The received streamer videos are laid out and displayed on edit screen 5 according to the edit screen layout information. When displayed, each video is displayed to be synchronized according to time information possessed by the streamer video. Also, the edit screen layout information has default setting information. In the present embodiment, an image of the instructor is shown on a single screen, for example.

Figure 4:
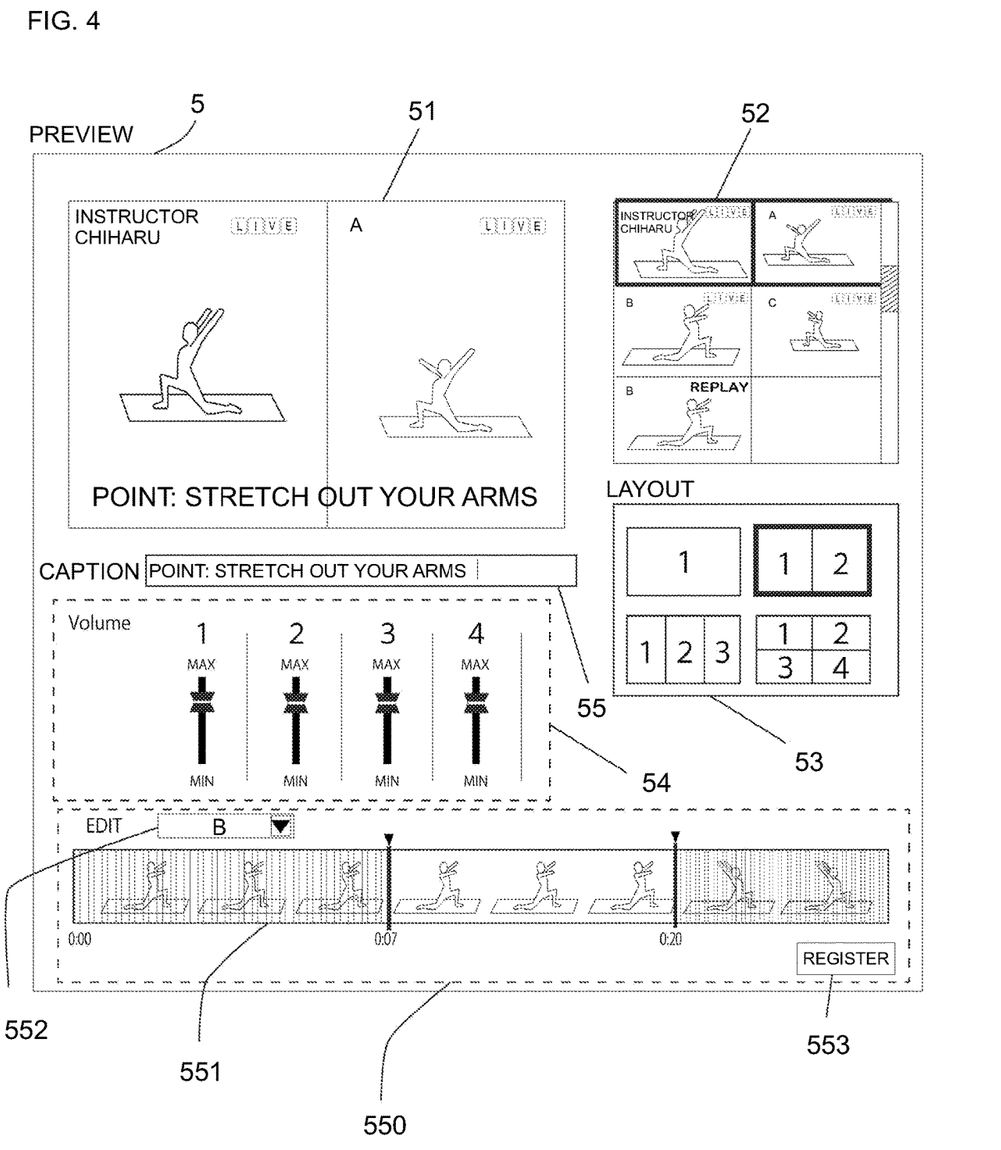
FIG. 4 is a schematic diagram showing an example of an edit screen after an edit operation.

The editor edits the streaming content on edit screen 5. The editor selects a screen configuration from layout selection section 53. In the example of FIG. 3, a layout where a single video is shown in one screen is selected. The display in preview section 51 can be switched by selecting an arbitrary configuration from layout selection section 53. After selecting the layout, the editor selects a video to display at each display location. For selection, the editor selects a section of interest in preview section 51 and then selects a video to display in that section from thumbnail display section 52. Alternatively, a video to display may be selected from thumbnail display section 52 and then dragged and dropped to the section of interest in preview section 51. FIG. 4 shows a display example of edit screen 5 with changed layout. In layout selection section 53, a layout with the screen divided into left and right is selected and highlighted, and the display of preview section 51 is shown divided into two left and right parts. The editor adjusts volume of a video to display in volume control section 54 shown in the section represented by a dashed line. In addition, a caption can be edited and inserted in caption input section 55.

Whenever an edit operation is performed on edit screen 5, editor terminal 3 transmits details of the edit operation to content distribution server 1 as edit information. The details of the edit information include screen layout information selected in layout selection section 53, instruction information on a streamer video to display on the specified screen layout, instruction information on volume control, caption information, and time information in the streamer video where each edit operation on which each of above information is based was performed. Time information is not the information of time when an edit operation is performed by an editor, but the time information of an edit operation on a time axis on a streamer video displayed in thumbnail display section 52 of edit screen 5.

Content distribution server 1 receives the edit information transmitted from editor terminal 3 at edit information transmitting/receiving unit 14. The received edit information is transmitted to streaming content generation unit 15.

Streaming content generation unit 15 generates streaming content based on the received edit information. Streaming content generation unit 15 constantly acquires streamer videos from buffer unit 12 in real time from the start of distribution of streaming content, regardless of whether edit information is received or not, and generates streaming content. When received edit information, streaming content generation unit 15 refers to instruction information of a streamer video, instruction information of volume control, caption information, and time information at which these operations are carried out, and generates streaming content while applying the details of edition instructed by the edit information to a plurality of streamer videos received from buffer unit 12 at appropriate timing.

Figure 5:
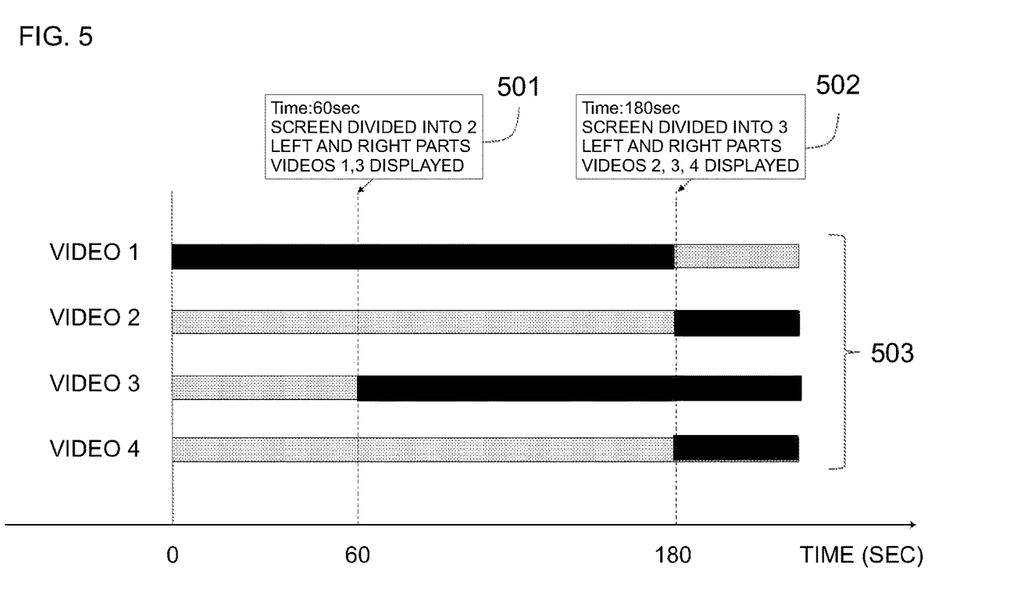
FIG. 5 is a schematic diagram showing an example of a time chart of a switching process of streamer videos.

FIG. 5 is a schematic diagram showing an example of a time chart of the operation in which streaming content is generated according to the edit information. The time on the horizontal axis is the time elapsed since the start of distribution and is consistent with the time information that each streamer video has. In other words, streaming content generation unit 15 synchronizes each streamer video based on time information. Timeline 503 represents the stream of each streamer video, with each of the streamer terminals 2 denoted by a number from 1 to 4 for convenience. The process flow in this time chart is as follows.
 (1) Video 1 is displayed on the entire screen according to the initial setting until 60 seconds from the start.
 (2) Based on edit information 501, at 60 seconds from the start, the layout is changed to a screen divided into two left and right parts, with Video 1 displayed in the left area and Video 3 displayed in the right area.
 (3) Based on edit information 502, the screen is divided into three parts at 180 seconds from the start and Video 2, Video 3 and Video 4 are displayed in this order from the left area.

This time chart represents the relationship between the passage of time and the edit operation, and does not indicate that the streamer video stored in buffer unit 12 is saved for the entire distribution time. Several seconds to several tens of seconds worth of streamer videos are temporarily stored in buffer unit 12 and updated continuously.

In generating streaming content, streaming content is generated at any timing with a delay of about 2 seconds from the latest time of recording of the streamer video in buffer unit 12. This is to synchronize timing of time specification in edit information and generation of streaming content in streaming content generation unit 15, since it takes time for the series of processes from transmitting an edit screen to editor terminal 3, displaying the edit screen at editor terminal 3, and receiving the edit information.

Streaming content generation unit 15 generates streaming content and transmits the generated streaming content to streaming content distribution unit 16. Streaming content distribution unit 16 distributes the streaming content to viewer terminals 4 via network 100.

According to the present embodiment, the content editing function in conducting streaming distribution from a plurality of streamer videos connected via a network can be provided as software, enabling a streamer and an editor to edit and stream streaming content without physical constraints on streaming location and at low cost.

Second Embodiment

In the present embodiment, content distribution server 1 further includes video storage unit (streamer video storage means) 17 to permanently store a streamer video. On edit screen 5, by specifying a predetermined time range for the streamer video in video storage unit 17, a past video (a playback video) of the streamer video can be made to be included in the streaming content.

Figure 6:
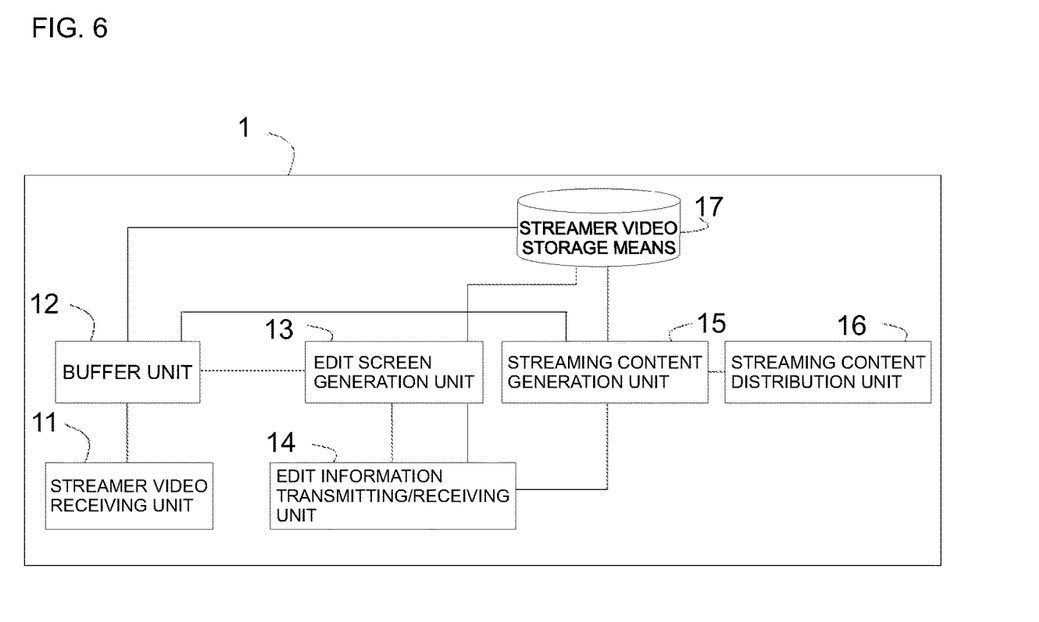
FIG. 6 is a block diagram showing an example of a functional configuration of a content distribution server according to a second embodiment.

FIG. 6 is a block diagram showing a configuration example of content distribution server 1 in the present embodiment. Video storage unit 17 is added to the configuration example in FIG. 2. Video storage unit 17 records a streamer video, receives the streamer video in real time from buffer unit 12, and records the streamer video as additional information. While buffer unit 12 temporarily records a predetermined range of a streamer video, video storage unit 17 continuously records a streamer video from the start of streaming to the latest update, and continues to retain the streamer video even after the end of streaming. The streamer video stored in video storage unit 17 is deleted from video storage unit 17 upon acceptance of an instruction to delete it at an unillustrated instruction means in edit screen 5. Also, the streamer video may be deleted automatically after a predetermined period of time after streaming content distribution.

The lower area surrounded by a dashed line in edit screen 5 in FIG. 3 represents playback instruction means 550. Editor terminal 3 accepts an instruction that an editor edits a part of past streamer video to be included in the streaming content as a playback video via playback instruction means 550. The editor selects a streamer-captured captured video to play back using pull-down 552. At this time, a username on the streamer terminal is displayed in pull-down 552 for selection. When a video to play back is selected, corresponding streamer videos are displayed as thumbnails in chronological order in timeline preview area 551. The display in chronological order may be displayed in its entirety from the beginning to the end of the video, or may be displayed in a range from a predetermined time before to the present or in a predetermined time range in the past.

The editor sets a time range to play back in timeline preview area 551. Setting is specified by dragging and dropping or clicking with a mouse over a range on the time axis in timeline preview area 551. In the example in FIG. 3, a range from 7 to 20 seconds is selected. When button 553 is pressed after a time range is selected, a thumbnail image is displayed in thumbnail display section 52 as a candidate for switching display of streaming content to indicate that the specified range of the selected streamer video is now eligible for playback. In the present embodiment, a still thumbnail of the first frame of the time range is displayed. Characters "REPLAY" are superimposed on a thumbnail to indicate that it is to be played back, as shown in FIG. 3. Also, characters "LIVE" are superimposed on a thumbnail of a streamer video being received in streaming. In this way, if such characters as "LIVE" and "REPLAY" are superimposed in thumbnail section 52, preview section 51 and streaming content to make the streaming video and the to-be-played back video distinguishable, it is easy for viewers to understand at what timing the video is made, which is desirable.

The editor drags and drops a thumbnail image in corresponding thumbnail section 52 to a part of the preview section where the editor intends to display at arbitrary timing when the editor intends to switch and display the video to play back. For example, in the edit screen shown in FIG. 4, A's streamer video is currently displayed in the right half area of preview section 51. When intending to display B's playback video in thumbnail section 52 instead, the editor drags and drops the thumbnail of B's playback video in thumbnail section 52 to a predetermined location in the right half area of preview section 51. Then, the video to play back is displayed in preview section 51 in the preview section, and the edit information includes identification information of the streamer video that is the video to play back and instruction information of a time range, screen layout information selected in layout selection section 53, instruction information on volume control, caption information, and time information in the streamer video where each edit operation on which each of above information is based was performed.

Streaming content generation unit 15 generates streaming content based on the received edit information. The generation method is almost the same as that of the first embodiment. When the video to play back is specified in edit information, the specified streamer video is retrieved from video storage unit 17 and the video in the specified time range is displayed according to switching time and layout in the edit information.

Streaming content generation unit 15 continuously generates streaming content during distribution and transmits the generated streaming content to streaming content distribution unit 16. Streaming content distribution unit 16 distributes the streaming content to viewer terminals 4 via network 100.

According to the present embodiment, in real-time streaming content distribution, it is possible to instantly switch back and display past scenes of a streamer video with an easy operation, without having to prepare separate recording equipment or editing equipment for playback.

In the present embodiment, an example in which video storage unit (streamer video storage means) 17 permanently stores streamer videos is described. It is possible, however, to change to store only a predetermined range (e.g., a time range or a range allowed by storage capacity) backward from the latest image. This reduces storage capacity and also solves the problem of fluctuations in storage capacity used depending on time length for storage (e.g., the entire time of stream content to distribute).

Third Embodiment

In the present embodiment, content distribution server 1 further includes gesture recognition unit 18, enabling a streamer to perform an edit operation such as video switching by a predetermined gesture.

Figure 7:
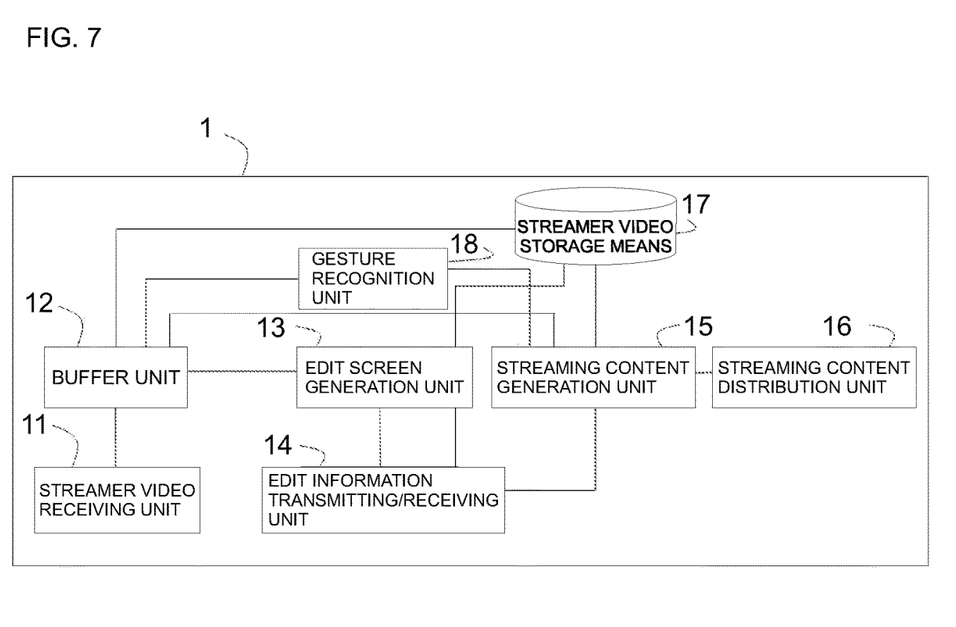
FIG. 7 is a block diagram showing an example of a functional configuration of a content distribution server according to a third embodiment.

FIG. 7 is a block diagram showing a configuration example of content distribution server 1 in the present embodiment. Content distribution server 1 of the present embodiment includes gesture recognition unit 18.

Gesture recognition unit 18 continuously receives streamer videos from buffer unit 12 during distribution of streaming content and detects whether a streamer who appears in any one of streamer videos is making a predetermined gesture. A means for recognizing gestures uses an existing skeletal recognition module to learn predetermined gestures in advance. If the detected gesture is an action related to editing streaming content, gesture recognition unit 18 generates edit information based on the detected gesture and transmits the generated edit information to streaming content generation unit 15. In order to enhance interactivity, it is desirable to perform such actions as switching of displayed videos based on gesture actions also on a video conferencing system among the streamers mentioned above.

A gesture example may include an action in which a streamer crosses his/her hands above his/her head and waving them in the air, wishing to switch to his/her own streamer video. Also, gestures such as pointing to one of the four corners of the screen and waving one's hand may be used as switching gestures for the streamer video, and the streamer video to be switched corresponding to each of the four corners may be defined in advance, so as to achieve switching to the corresponding streamer video. In any case, it is desirable to arbitrarily set up a gesture that is distinguishable from actions that a streamer can perform during distribution of streaming content.

The edit information includes time when the gesture was made and switching information of the streamer video specified by the gesture. The edit information includes details common to those of the edit information transmitted from edit information transmitting/receiving unit 14. Streaming content generation unit 15 generates streaming content based on the edit information transmitted from gesture recognition unit 18.

Streaming content generation unit 15 will receive edit information from both edit information transmitting/receiving unit 14 and gesture recognition unit 18. Streaming content generation unit 15 may generate streaming content by applying edit information whenever it receives edit information without any distinction, or may give priority to one of them and may, for example, give priority to the edit information from gesture recognition unit 18 when it receives edit information from both gesture recognition unit 18 and edit information transmitting/receiving unit 14 within a few seconds.

Streaming content generation unit 15 continuously generates streaming content during distribution and transmits the generated streaming content to streaming content distribution unit 16. Streaming content distribution unit 16 distributes the streaming content to viewer terminals 4 via network 100.

This allows the streamers to instantly switch screens at their will. While edit operations such as screen switching are performed on the basis of a content program configuration or at the discretion of the editor under normal circumstances, instant switching by an action of a streamer could create streaming content that better reflects the streamer's intentions and gives a sense of realism to a viewer. Also, a streamer can carry out a switch/edit operation of streaming content without manipulating a streamer terminal or an editing terminal himself/herself, so the streamer's operation is not interrupted during content distribution.

While content distribution server 1 is provided with video storage unit 17 in the configuration example shown in FIG. 7, video storage unit 17 may be omitted.

Fourth Embodiment

Content distribution server 1 may have a configuration devoid of generation unit 13 and edit information transmitting/receiving unit 14 from the configuration of the third embodiment, and devoid of connection to an editor terminal. Screen switching during streaming content distribution is performed solely by a gesture of a streamer. The edit operation by the streamer's gesture and the generation of streaming content are the same as the way described in the third embodiment.

Therefore, content distribution server 1 can be implemented in a simpler configuration without the need to prepare a terminal for editing. Also, a streamer can carry out a switch/edit operation of streaming content without manipulating a streamer terminal or an editing terminal himself/herself, so the streamer's operation is not interrupted during content distribution.

While the present invention made by the present inventors has been described in detail with respect to the embodiments thereof, the present invention is not limited to these embodiments. Various changes may be made without departing from the spirit and scope of the present invention.

INDUSTRIAL APPLICABILITY

The present invention can be used for a video distribution server that relays video images from a plurality of cameras and distributes live streaming broadcasts to a plurality of viewer terminals.

EXPLANATION OF SIGN

1 Content distribution server
11 Streamer video receiving unit
12 Buffer unit
13 Edit screen generation unit
14 Edit information transmitting/receiving unit
15 Streaming content generation unit
16 Streaming content distribution unit
17 Streamer video storage unit
18 Gesture recognition unit
2 Streamer terminal
3 Editor terminal
4 Viewer terminal
5 Edit screen
501, 502 Edit information
503 Timeline
51 Preview section
52 Thumbnail display section
53 Layout selection section
54 Volume control section
55 Caption input section
550 Playback instruction means
551 Timeline preview area
552 Pull-down
553 Button
100 Network

The invention claimed is:

1. A content distribution server that receives streamer videos from a plurality of streamer terminals connected via a network, generates streaming content, and distributes the streaming content to viewer terminals, the content distribution server comprising:
   a streamer video receiving unit that receives the plurality of streamer videos;
   a buffer unit that temporarily stores the plurality of streamer videos;
   an edit screen generation unit that synthesizes the plurality of streamer videos in the buffer unit and generates an edit screen for accepting an edit operation of the streaming content from an editor terminal connected via the network;
   an edit information transmitting/receiving unit that transmits the edit screen to the editor terminal and receives, as edit information, the edit operation entered from the editor terminal via the edit screen;
   a streaming content generation unit that generates the streaming content from the plurality of streamer videos held in the buffer unit on the basis of the edit information; and
   a streaming content distribution unit that distributes the streaming content to the viewer terminal via the network,
   wherein the content distribution server further comprises a gesture recognition unit;
   the gesture recognition unit recognizes that one of the streamers has performed a predetermined gesture in the plurality of streamer videos received from the buffer unit, and when the recognized gesture is one requesting a switching operation in the streaming content, the gesture recognition unit transmits the edit information to the streaming content generation unit based on the detected gesture.

2. The content distribution server according to claim 1, wherein the edit information includes a screen configuration in the streaming content and a switching instruction for the plurality of streamer videos to be laid out in the screen configuration.

3. The content distribution server according to claim 2, wherein
   the content distribution server further comprises a streamer video storage means;
   the streamer video storage means stores a part or all of the plurality of streamer videos stored in the buffer unit;
   the edit information transmitting/receiving unit further includes a function of receiving, included in the edit information, a playback instruction entered at the editor terminal via the edit screen;
   the playback instruction includes specification of a streamer video to play back in the streamer video storage means and indication of a time range of the video to play back to be switched and inserted in the streaming content; and
   the streaming content generation unit generates, based on the received edit information, the streaming content using the specified range of streamer video in the streamer video storage means specified in the playback instruction.

* * * * *